Patented Feb. 14, 1928.

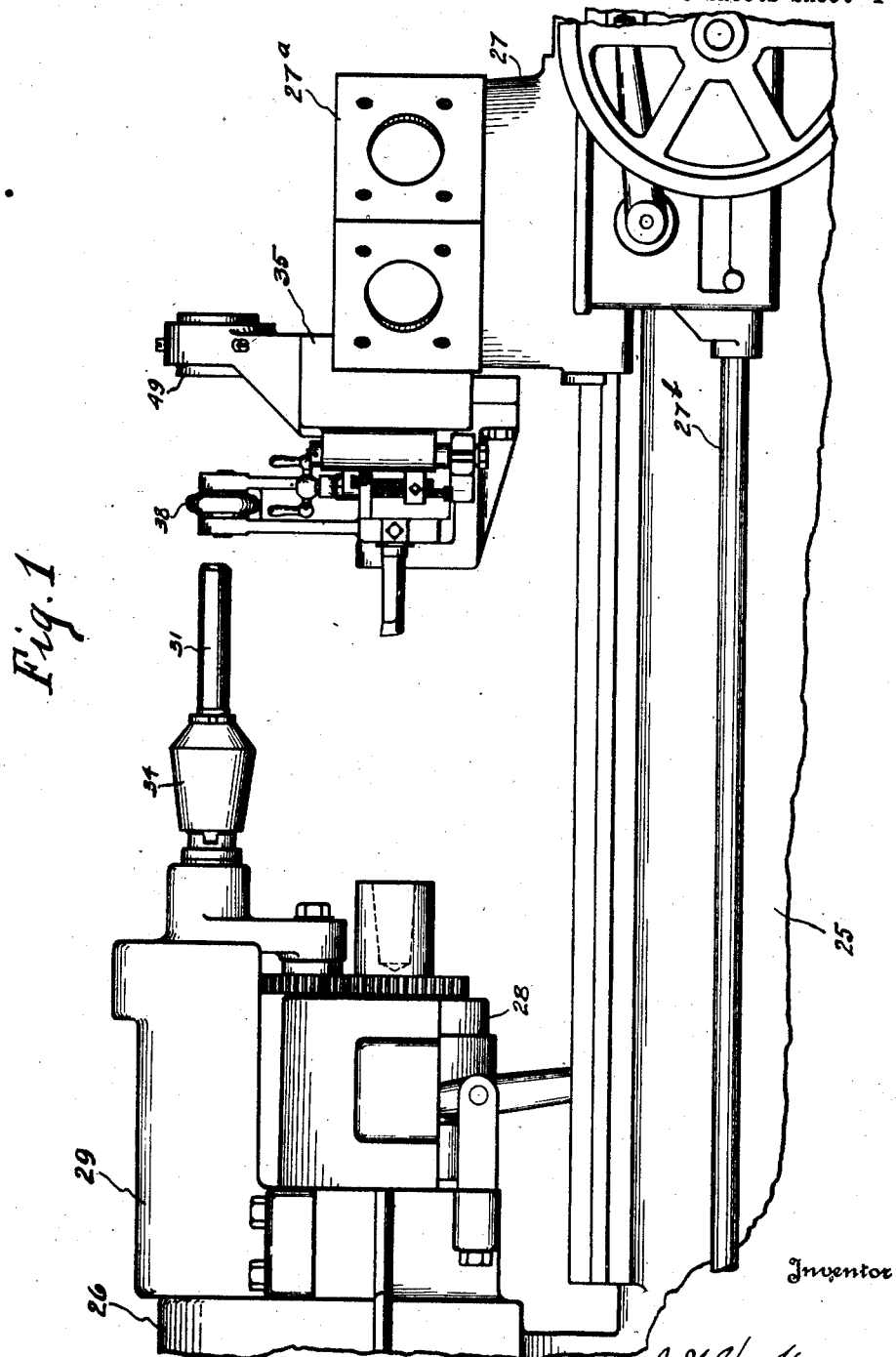

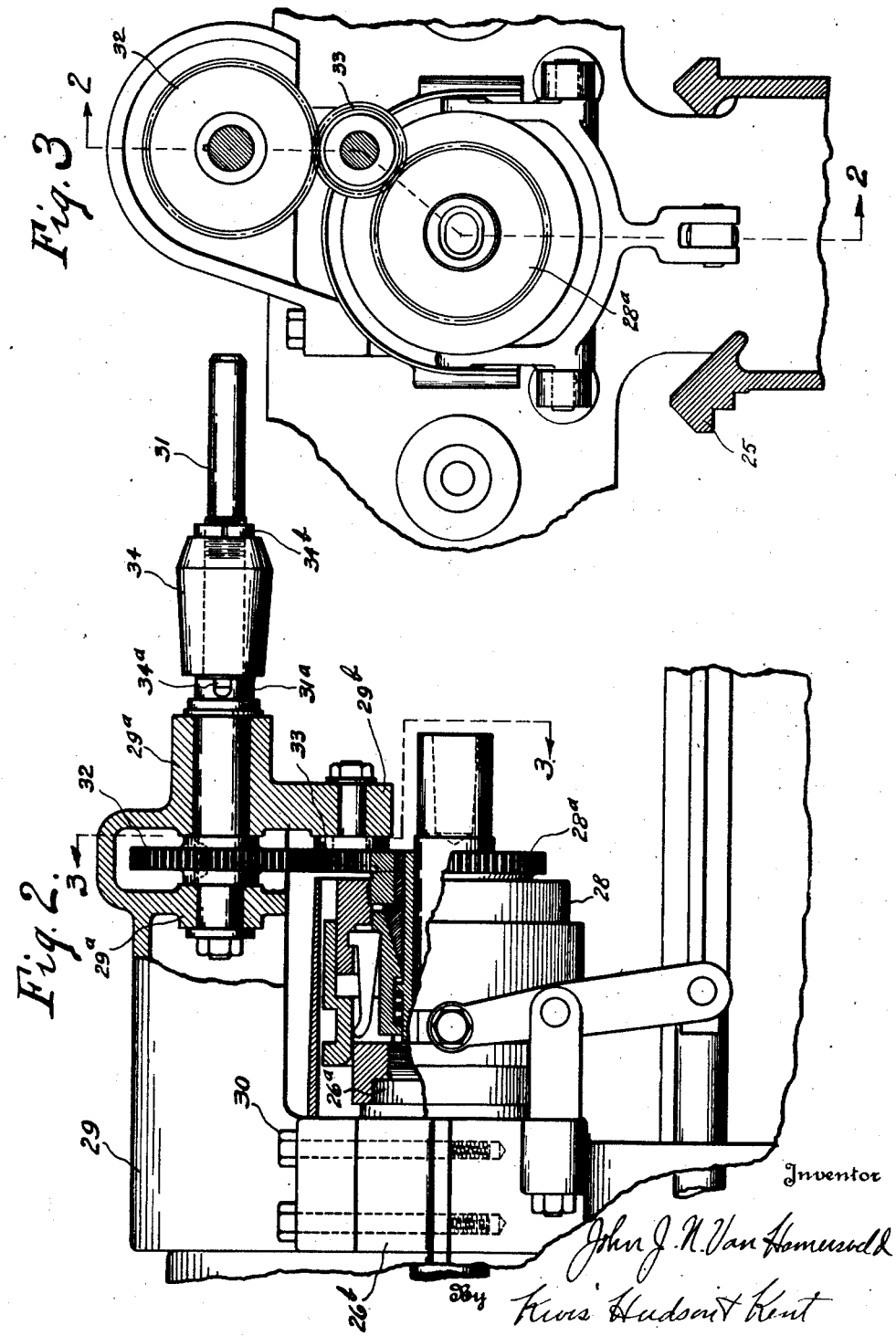

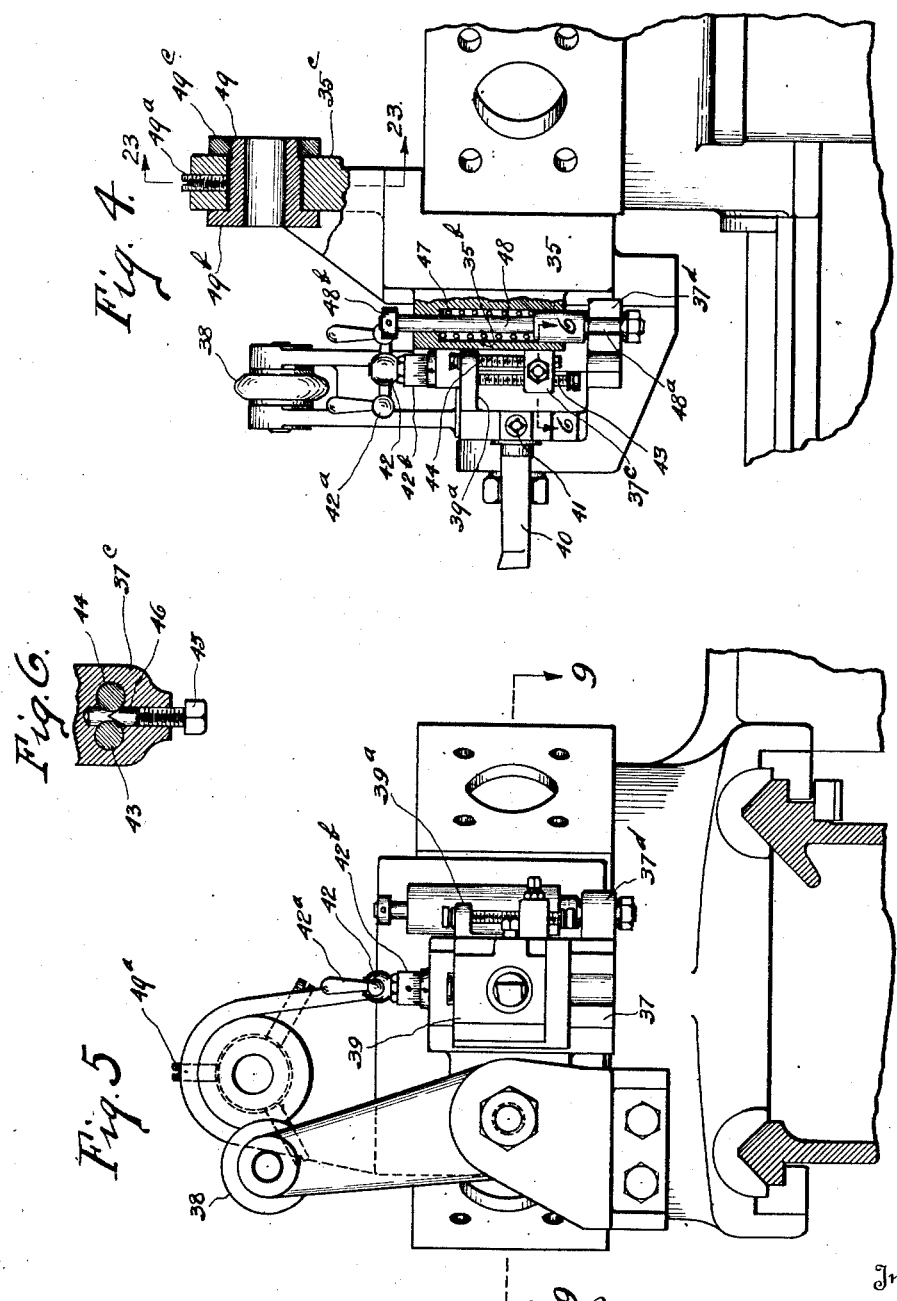

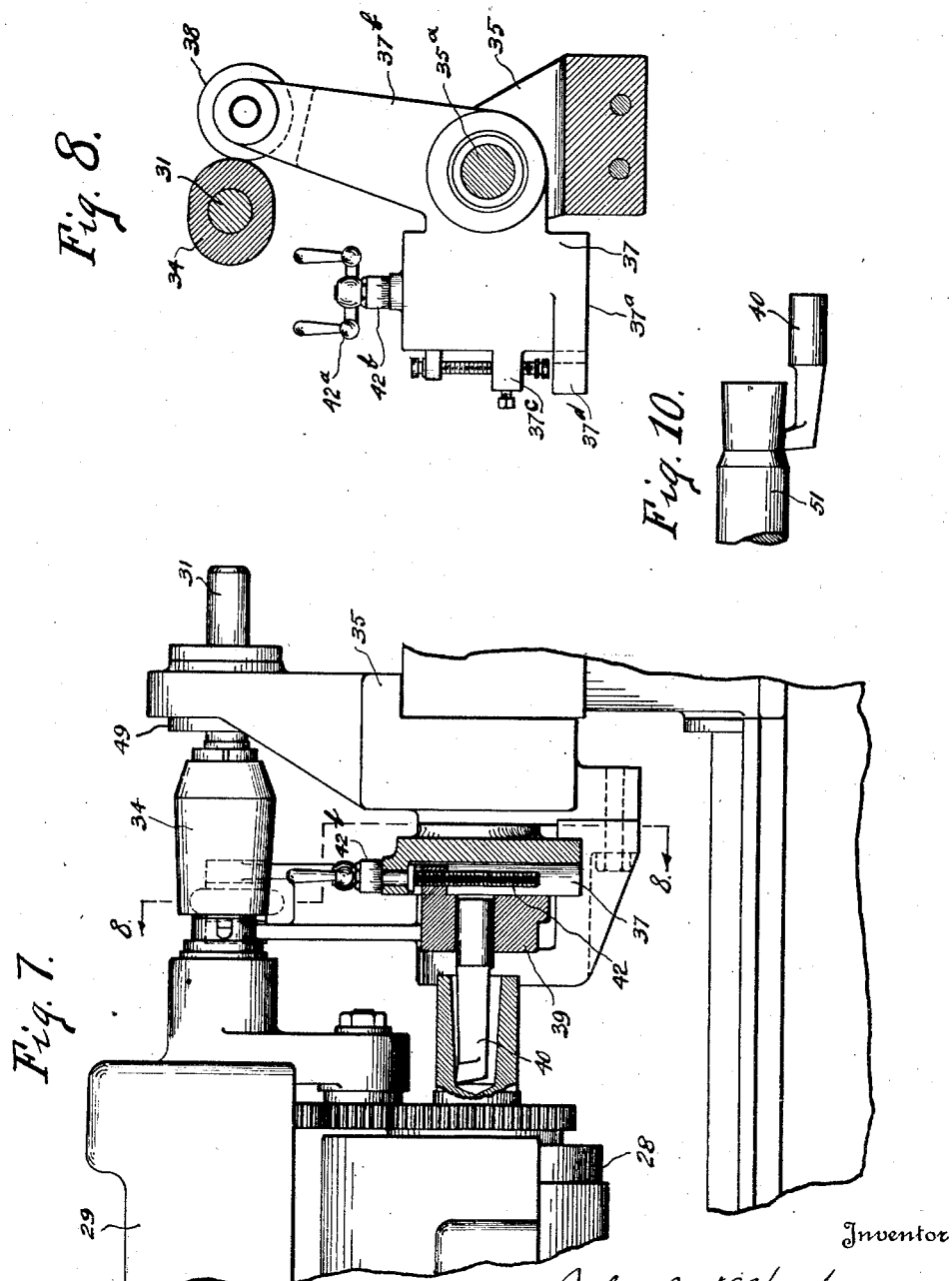

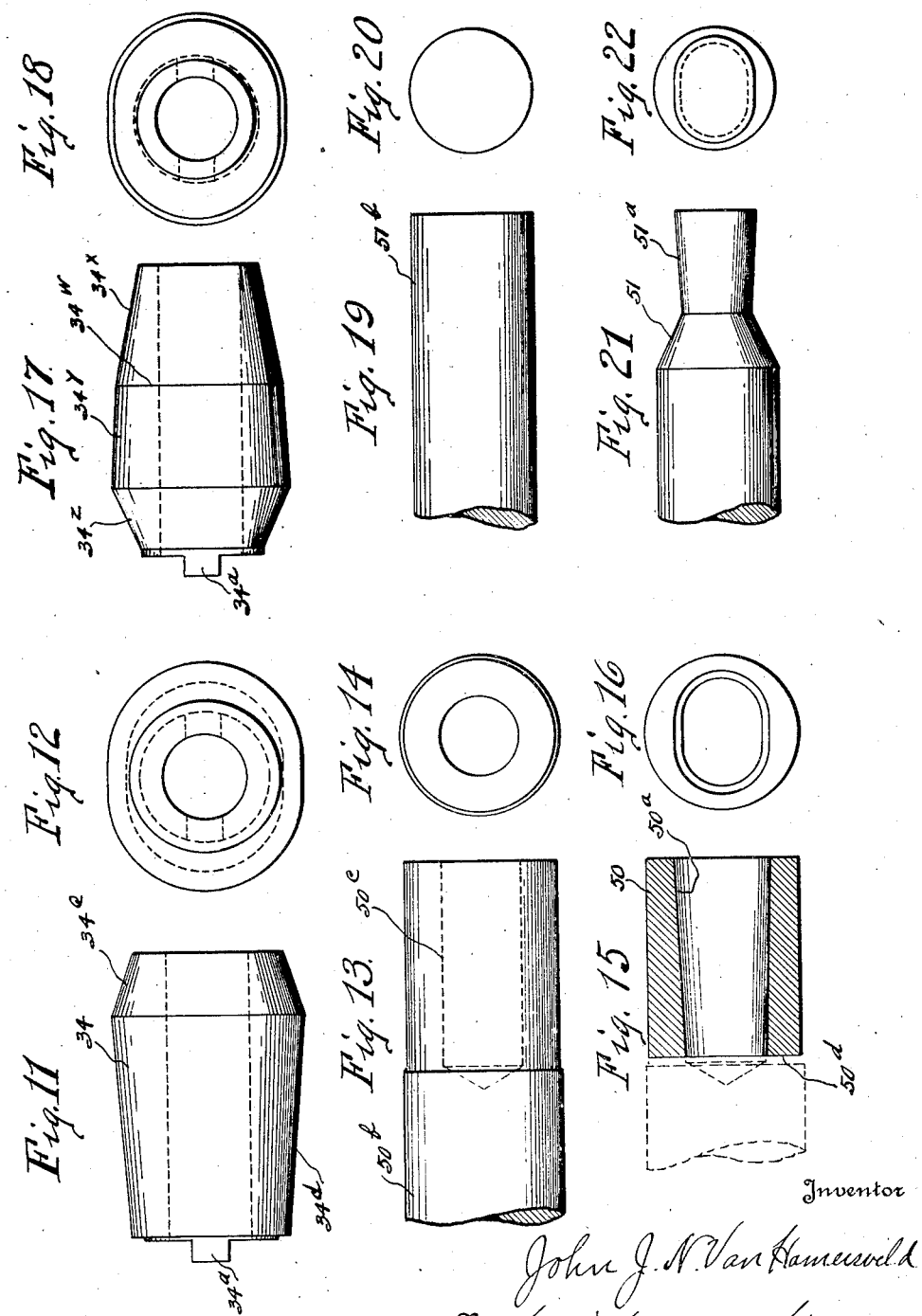

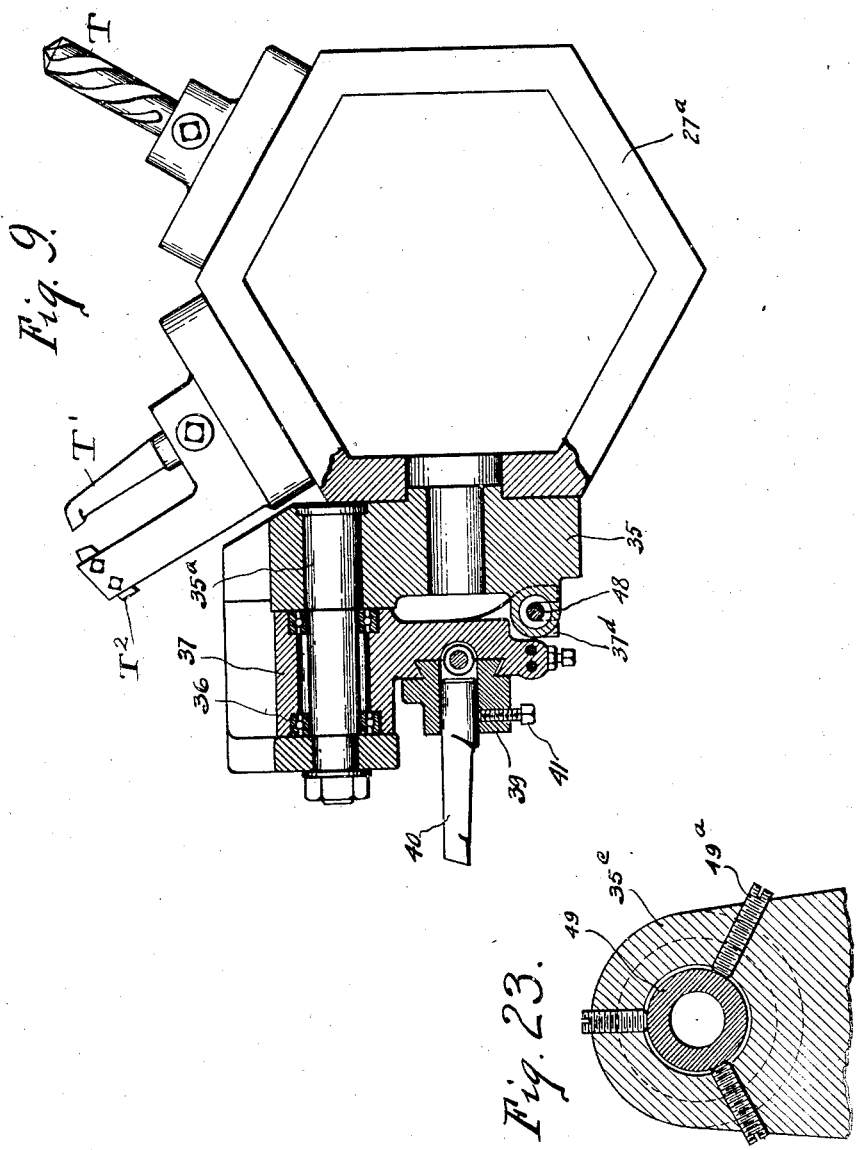

1,659,385

UNITED STATES PATENT OFFICE.

JOHN J. N. VAN HAMERSVELD, OF CLEVELAND HEIGHTS, OHIO, ASSIGNOR TO THE WARNER AND SWASEY COMPANY, OF CLEVELAND, OHIO, A CORPORATION OF OHIO.

ATTACHMENT FOR MACHINE TOOLS FOR TURNING AND BORING IRREGULAR SURFACES.

Application filed October 10, 1925. Serial No. 61,663.

This invention relates to machine tools and has for its chief object the provision of a machine tool, or of an attachment for tools of standard construction, said machine tool or attachment being adapted for turning or boring a surface which is irregular either longitudinally or laterally of the axis of the machine tool, or both longitudinally and laterally thereof.

More particularly, it is the aim of the invention to provide means whereby a surface may be turned on the exterior of the work, or may be bored on the interior, which surface in cross-section may be oval or otherwise non-circular in cross-section, and which may be straight, tapered or otherwise irregular in shape longitudinally considered.

Further the invention aims to accomplish the above with mechanism which enables the quick conversion or change in set-up by which the machine can be readily changed from a condition of turning to one of boring, and vice versa.

A still further object is to provide means whereby the boring and turning operations for a surface requiring a change in location of the turning or boring portion of the tool during the cutting operation, and which in the embodiment herein illustrated is brought about by an oscillation of the tool-holder, may be accomplished with great rapidity, and with great steadiness of the parts, which permits accurate work to be done.

A still further object is to accomplish the above by means of an attachment which can be very readily and quickly applied to or removed from a machine tool such as a turret lathe.

The above and other objects are attained by my invention which may be here briefly summarized as consisting in certain novel details of construction, and combinations and arrangements of parts which will be described in the specification and set forth in the appended claims.

In the accompanying sheets of drawings wherein I have illustrated the preferred embodiment of my invention for use in both turning and boring surfaces which are oval, and therefore non-circular in cross-section, and which are tapered longitudinally or axially, Fig. 1 is a side elevation showing a portion of the bed, head and turret of a standard turret lathe with the head and turret equipped with my improvements adapted for the purpose above stated; Fig. 2 is an enlarged view of the head portion of the machine with parts in section along the irregular line 2—2 of Fig. 3, looking in the direction indicated by the arrows; Fig. 3 is a sectional view substantially along the line 3—3 of Fig. 2, looking in the direction indicated by the arrows; Fig. 4 is an enlarged side view of a portion of the turret end of the machine with parts in section; Fig. 5 is an inside face view of the same with the bed of the lathe in section; Fig. 6 is a detail sectional view substantially along the line 6—6 of Fig. 4; Fig. 7 is a view similar to Fig. 1, but with the turret and turret slide moved substantially the maximum distance toward the head, parts being in section; Fig. 8 is a sectional view substantially along the line 8—8 of Fig. 7, looking in the direction indicated by the arrows; Fig. 9 is a horizontal, sectional view substantially along the line 9—9 of Fig. 5; Fig. 10 is a detail view showing the work and tool employed for turning instead of boring, as illustrated in the preceding figures; Figs. 11 and 12 are respectively a side elevation and an end view of a cam member used for actuating the tool-holder in boring an oval, tapered opening; Figs. 13 and 14 are respectively a side elevation and an end view showing the stock or work-piece preparatory to the boring operation; Figs. 15 and 16 are respectively a longitudinal sectional view and an end view of the finished work after the completion of the boring operation by which a tapered, oval opening is bored; Figs. 17 and 18 are respectively a side elevation and an end view of a cam used in turning an oval, tapered surface; Figs. 19 and 20 are respectively a side elevation and an end view of the stock or work-piece prior to the turning operation; Figs. 21 and 22 are similar views of the work-piece after the same has been turned to a tapered oval; and Fig. 23 is a detail sectional view substantially along the line 23—23 of Fig. 4.

As stated in the early part of the specification, although my invention may be embodied in a special machine tool, it may be, and preferably is in the form of an attachment to standard machine tools, and in the drawings I have illustrated a portion of a standard turret lathe, which includes a bed 25, a head 26, and a turret slide 27 having the usual turret 27ª. The turret slide will be moved back and forth along the bed by the standard mechanism, a portion of which, including a feed shaft 27ᵇ, being illustrated.

The attachment includes parts secured both to the head and to the tool-supporting part, which in this instance is the turret, although it is not essential that the part which supports the tool be attached to the turret, but in the present embodiment, that method of tool supporting is employed.

The attachment in so far as the head is concerned, is associated with a suitable work-holding chuck 28, attached to the spindle 26ª of the head. The details of the chuck are immaterial to my invention, a chuck of the draw-back type being illustrated, which chuck is of standard form, except that the front collar is replaced by a gear sleeve 28ª.

The portion of the attachment which is applied to the head includes a bracket 29 which is secured by bolts 30 to the spindle-bearing cap 26ᵇ of the head. This bracket extends upwardly and laterally toward the rear side of the machine, and has a portion overhanging the chuck, as well illustrated in Figs. 2 and 3. The outer upper portion of this bracket has bearing portions 29ª in which is rotatably supported a cam-shaft 31 which extends axially of the machine, above and to the rear side of the spindle of the head. This shaft is rotated in predetermined timed relation with respect to the rotation of the spindle and chuck, and preferably at the same speed as the chuck is rotated, this being brought about by a gear 32 keyed to the shaft 31, and an idler gear 33 which meshes both with the gear 32 and with the gear sleeve 28ª, the idler gear 33 being supported in a depending portion or arm 29ᵇ of the bracket 29. To cause the cam-shaft 31 to be driven at the same speed as the spindle, the gear 32 is, of course, of the same diameter as the gear sleeve 28ª.

Secured to cam-shaft 31 is a cam 34, which is instrumental in oscillating the tool-holding member to be referred to presently. The cam 34 is removably secured to cam-shaft 31, and may be held thereon in any suitable manner, but in this instance, and preferably, the rear end of the cam is provided with projecting lugs 34ª (see Figs. 2, 11, 12, 17 and 18) which lugs fit into a pair of depressions in a slightly enlarged portion 31ª of cam-shaft 31, and is pressed against the same by a nut 34ᵇ, threaded onto the shaft and engaging the front end of the cam.

It is to be noted that the cam is thus secured to the shaft some distance rearwardly of its forward end, this being important for the reason that the shaft is employed not only to support and rotate the cam, but it has the equivalent of a pilot bar function, as will be explained presently, for the purpose of steadying the cam.

It might be here mentioned that while it is important that the cam be held rigidly or fixedly on the shaft, it is equally important that it be readily removable to adapt the attachment for both turning and boring, or for the production of differently shaped work-pieces.

The attachment in so far as the tool-holding portion is concerned, includes a bracket 35, which in this case is secured to one of the faces of the turret 27ª in the usual manner. The bracket 35 is provided with a stud 35ª which is rigidly secured to the bracket and projects toward the head. Mounted on this stud through the medium of anti-friction bearings 36, is an oscillatory tool-carrying member 37, having a tool-carrying portion 37ª, and an upwardly and laterally projecting arm 37ᵇ, provided at its outer end with a roller 38 adapted to engage the surface of the cam 34.

The tool-carrying portion 37ª of the oscillatory member is provided on its side facing the head, with a slide 39, to which is secured in any suitable manner a cutting-tool 40. In this instance the cutting-tool is clamped by means of a set-screw 41 into an opening of the slide.

The slide is adapted to be adjusted up and down by means of an adjusting screw 42, which is held in the tool-carrying portion of the oscillatory member, as illustrated in Fig. 7, this screw being provided with a handle 42ª and having a threaded engagement with a boss or lug on the slide. A very fine adjustment is permitted, particularly by reason of the fact that the screw is provided with a graduated collar 42ᵇ.

After the slide has been adjusted to bring the cutting-portion of the tool to the right elevation, it is important that the slide be securely held against movement, and this is accomplished in this instance by a special locking provision including a holding-screw 43, which has a threaded engagement with a forwardly projecting lug 37ᶜ on the tool-carrying portion of the oscillatory member, the upper end of this screw bearing against the lower side of a laterally projecting lug 39ª of the slide, this screw preventing the slide 39 from moving downwardly. A second holding-screw 44 is provided to hold the slide against moving upwardly, this screw passing loosely, or with a clearance through the lug 39ª, and having a shoulder at the upper end which rests on top of this lug. Additionally it is threaded in the lower lug 37ᵇ of the oscillatory member. As additional precaution against accidental movement of the slide, due to vibration, provision is made for locking the holding-screws 43 and 44 against rotation, this consisting of a locking-screw 45 having threaded engagement with the lug 37ᶜ and engaging a plug 46 (see Fig. 6) with a tapered inner end adapted to be forced by the screw 45 against the holding screws 43 and 44. This plug is preferably made of suitable special material such as brass, so that when forced inwardly it will not damage the threads of the screws which it engages.

It will be seen, therefore, that when it is desired to lower the slide with the tool, the locking-screw 45 is backed away, the holding-screw 43 is lowered, whereupon the slide can be moved downward the right distance by turning the screw 42, after which the screw 44 is lowered until the shoulder at the upper end thereof engages the lug 39ᵃ, and screw 43 is elevated until its upper end engages the lower side of lug 39ᵃ, after which the locking-screw 45 is tightened to lock both screws 43 and 44 in position. If it is desired to elevate the slide and the tool, screw 44 is elevated after the locking-screw 45 has been released, and after the slide has been raised by turning the screw 42, screw 44 is lowered until the shoulder at the top thereof engages the upper side of lug 39ᵃ, and screw 43 is raised until it engages the lower side of the lug 39ᵃ, after which, screw 45 is tightened to again lock the holding-screws 43 and 44 in position. The position of the tool will be changed not only when the operation is changed from boring to turning and vice versa, but also in either boring a hole or turning an outer surface when considerable stock is to be removed, necessitating both one or more roughing out cuts and a finishing cut.

It will be observed, particularly from Figs. 7 and 8, that the roller 38 engages the back side of the cam 34, and since the cam is supported at the rear side of the bed, or rearwardly of the work-piece, it is obvious that the cam acting through the roller 38 and arm 37ᵇ, positively feeds the tool inwardly to the work. To cause the roller 38 to keep in engagement with the surface of the cam at all times, and particularly when the tool is receding from the axis of the work, a spring is employed, which spring is preferably carried in a barrel-like extension 35ᵇ of the bracket 35, the spring being shown in Fig. 4, and designated 47. As shown in this figure, the spring at the top bears against a shoulder at the upper part of the barrel, and at its lower end it bears against a shoulder of a plunger 48 extending through the barrel and spring, and at its lower end, beneath the barrel, having a reduced portion 48ᵃ engaging in a slot of a lug 37ᵈ at the lower end of the tool-carrying portion 37ᵃ of the oscillatory member 37. It will be noted that above and below the lug 37ᵈ, the plunger has rounded seats which engage respectively the upper and lower faces of the lug so as to accommodate the movements of the oscillatory member when the attachment is in action. The plunger 48 has a shoulder 48ᵇ which engages the top of the barrel when the roller 38 rides off the cam and thus limits the inward movement of the roller and associated parts.

When the tool is making a turning or boring cut on the work-piece, it is obvious that heavy stresses are transmitted from the cam to the tool-holding member, making it important that the cam-shaft 31 be steadied in order that accurate work may be done. This is accomplished by my invention by giving the shaft 31 a pilot-bar function, the effect of which is to steady the shaft and hold it in parallelism with the axis of the machine while the heaviest cuts are being made, and, in fact, during all cutting conditions. To accomplish this, the bracket 35 is provided with an arm 35ᶜ, projecting upwardly and toward the rear side of the machine, and in the upper end of this arm I mount a bushing 49 which is so positioned, and the bore of which is of such a size, that when the turret moves forwardly this bushing receives the portion of the shaft 31 projecting beyond the cam 34, so that the shaft will be supported at both ends when the cutting tool is in action, as well illustrated in Fig. 7. In order that the bushing may be in strict alignment with the shaft 31, and also to compensate for any wear which may occur, or slight irregularities in positioning when the attachment is set up, the bushing is adjustably mounted in the arm 35ᶜ, preferably through a series of equally spaced set-screws 49ᵃ (see Fig. 23). The bushing 49 is provided at its end facing the head, with a shoulder 49ᵇ, which is adapted to be brought up against the face of the arm by a nut 49ᶜ, adapted to be screwed onto the opposite end of the bushing, as clearly illustrated in Fig. 4.

The shape of the cam which oscillates the tool-holding member depends first, upon whether an internal surface is to be bored and an external surface is to be formed or cut, and second, upon the shape of the surface both as to cross-section and length. While my invention is adapted for both internal boring and external cutting, and may be utilized in the production of work-pieces having a variety of shapes or forms, internally and externally, I have, by way of example, illustrated in Figs. 15, 16, 21 and 22, two different products or work-pieces, one consisting of a die 50, having an internal bore 50ᵃ, which is both oval in shape transversely considered, and tapered longitudinally, and a punch 51 with an external surface 51ᵃ, which is oval in cross-section, and is reversely tapered, as illustrated. It might be mentioned that the punch and die here illustrated, are adapted to be used together in a punch press to punch elongated or oval-shaped openings in steel plates and the like. Additionally I have illustrated in Figs. 11 and 12 a cam which is employed in the production of the die of Figs. 15 and 16, and in Figs. 17 and 18, a cam is utilized in the production of the punch 51, shown in Figs. 21 and 22. It might be stated also, that the cam 34 of Figs. 11 and 12 is the same cam illustrated in the preceding figures, and that the die shown in Figs. 15 and 16 is illustrated in a partially completed state in some of the preceding figures referred to in describing the machine.

The die 50 may be formed from bar stock $50^b$, fed through the work spindle of the machine, and adapted to be clamped in the chuck. To produce a die of the appropriate length, a given length of the bar is first given a straight internal bore as indicated at $50^c$, by drilling, and then the hole is bored and the outer surface is turned (see Fig. 13). The drilling of the hole, the boring of the same and the turning of the outer surface are accomplished by standard tools T, T' and $T^2$, carried by the turret, as indicated in Fig. 9. Then the attachment of this invention is brought into play and the oval and tapered opening is bored with the cam 34, which as before stated, turns at the speed of the work-piece and rapidly oscillates the tool. It will be noted that the cam 34 is provided on the outer end with a short tapered portion $34^c$, which leads up to the tapered and oval surface $34^d$, which is the active surface engaged by the roller 38 while the cutting is taking place, the shape of this portion being such as to cause the boring tool to cut or bore an oval tapered surface of the desired shape in the work-piece 50.

After the boring operation is completed, the piece 50 is cut from the bar by any suitable tool, along the line $50^d$.

The punches 51 may also be formed from round bar stock $51^b$, illustrated in Figs. 19 and 20, and in forming these punches 51 a cam, illustrated at $34^w$ in Figs. 17 and 18, is employed. This cam is provided with a tapered surface $34^x$, up along which the roller rides in reaching the oval and tapered surface $34^y$, appropriately shaped as to cross-sectional outline and taper, to form the oval-shaped and main tapered part of the punch, this surface $34^y$ of the cam being contiguous to an oval-shaped but oppositely tapered face $34^z$ of the cam, this being utilized in forming the relatively short and reversely tapered part of the punch.

It is to be noted that in changing from an internal boring operation to an external turning operation, as illustrated in Figs. 7 and 10, the slide is lowered and then locked in position in the manner previously explained, so as to bring the cutting point of the tool under the work, as illustrated in Fig. 10, and, of course, in changing from one operation to the other, the cam utilized in boring is removed from shaft 31 by removing the nut $34^b$, and is replaced with a cam appropriate for the external turning operation. The two changes above referred to, i. e. the changing of the position of the tool and the changing of the cams are all that is necessary to adapt the machine for either operation, and as these changes can be effected quickly, the machine is efficient in the respect that there is little loss of time in the conversion.

The particular way in which the tool-holder is mounted, and the manner in which it is oscillated are also important factors in the high efficiency of the machine. The fact that the tool and its adjustable slide are mounted on an oscillating supporting member, in turn journaled through the medium of anti-friction bearings, and the fact that the tool is positively fed into the work through the action of the rotating cam acting on the roller, which is maintained in contact with the cam by a spring 47, enables a very high turning speed to be maintained, and an exceedingly rapid oscillatory movement imparted to the tool-holder without vibration or chattering. These features admirably adapt the machine for operating on material such as aluminum and brass, which require a high cutting speed for satisfactory results and efficiency. Furthermore, the fact that the rotating shaft supporting the cam which oscillates the tool has its outer end supported in a manner similar to a pilot-bar, and enables the cam and its supporting shaft to effectively resist the back pressure of the roller incident to the taking of a deep cut, particularly an eccentric cut, as is the case in producing articles such as herein illustrated, is responsible to an important degree in the efficiency of the machine from the standpoints of speed of operation and accuracy of results.

Above I have referred to the fact that the dies and punches are formed from bar stock, but it will be obvious that they may be formed from previously cut lengths or forgings adapted to be supported in a suitable chuck.

While I have shown the preferred construction, I do not desire to be confined to the precise details or arrangements shown, and it is understood also, that while I have illustrated the machine and described it in connection with the production of specific articles, it is to be understood that the machine may be utilized for producing other articles or work-pieces than those described, and work-pieces differently shaped. I therefore aim in my claims to cover all modifications which do not involve a departure from the spirit and scope of my invention in its broadest aspects.

Having described my invention, I claim:

1. A machine tool having a bed provided with a head having a rotating spindle and with a slide, a shaft carried by the head in parallel relation with the spindle and connected to the spindle so as to be rotated thereby said shaft being held against endwise movement, a cam carried by the shaft, a movable member carried by the slide and provided with means engaging the cam and with a portion for receiving a tool.

2. A machine tool having a bed provided with a head having a spindle and with a slide, a shaft carried by the head in parallelism with the spindle and having a driving connection with the latter, a cam carried by the shaft and held against endwise movement, a tool holding member carried by the slide, and having means for forming sliding engagement with the shaft and provided with a movable member having means for engaging the cam and a part adapted to receive a tool.

3. A machine tool having a bed, a head and a slide thereon, the head having a spindle, an attachment for the head comprising a bracket carrying a shaft held from endwise movement therein and provided with a cam fixed thereto, a gear train connecting said shaft to the spindle, an attachment for the slide comprising a bracket provided with an oscillatory member having a roller adapted to engage the cam, and having a work cutting tool.

4. A machine tool having a bed, a head and a slide on the bed, a rotatable member carried by the head, an oscillatory member carried by the slide, a rotatable cam for actuating the oscillatory member, and a rotatable shaft carrying said cam, said shaft being carried by the head and adapted to have sliding engagement with said slide.

5. A machine tool having a bed and two members, one having a rotatable part and the other having an oscillatory part, one of said parts adapted to receive the work and the other a tool, a rotary cam for actuating the oscillatory part, a shaft carrying said cam and supported on one of said members, the other member adapted to receive the shaft with sliding engagement.

6. A machine tool having a bed and two members, one having a rotatable part and the other having an oscillatory part, one of said parts adapted to receive the work and the other a tool, a rotary cam for actuating the oscillatory part, a shaft carrying said cam and supported on one of said members, a device on the other member adapted to receive the shaft with sliding engagement, and means for adjusting said device so as to bring it into alignment with the shaft.

7. A machine tool having a bed, a head and a sliding member on the bed, a rotatable part carried by the head, an oscillatory part carried by the sliding member, means for oscillating said part, a slide on said oscillatory member adapted to carry a tool, means for adjusting the slide, and means for locking the slide against accidental movement.

8. A machine tool having a bed, a head and a sliding member on the bed, a rotatable part carried by the head, an oscillatory part carried by the sliding member, means for oscillating said part, a slide on said oscillatory part and adapted to be provided with a tool, means for adjusting said slide, adjustable abutment means for locking the slide in predetermined position, and means for locking said abutment means against movement.

9. An attachment for a machine tool having a head with a rotating spindle, a bed and a sliding member, said attachment comprising a rotary shaft having a cam and adapted to be applied to the head in parallel relation to the spindle and to be rotated by the spindle, and an oscillatory member adapted to be provided with a cutting tool and to be secured to the sliding member said member having a part adapted to engage said cam.

10. A machine having a bed, a work carrying member with a rotary spindle, and a tool carrying member, one slidable towards and from the other, a cam located laterally of the spindle, and rotated thereby, a movable tool holder carried by the tool carrying member and provided with a follower engaging the cam and having a movement relative to the cam lengthwise thereof during the relative sliding movements between the work and tool carrying members.

In testimony whereof, I hereunto affix my signature.

JOHN J. N. VAN HAMERSVELD.